(12) United States Patent
Park et al.

(10) Patent No.: US 10,789,161 B2
(45) Date of Patent: Sep. 29, 2020

(54) DATA STORAGE DEVICE TO IDENTIFY AND PROCESS A SEQUENTIAL READ REQUEST AND OPERATING METHOD THEREOF

(71) Applicant: SK hynix Inc., Gyeonggi-do (KR)

(72) Inventors: Byeong Gyu Park, Gyeonggi-do (KR); Young Ick Cho, Seoul (KR); Seung Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 100 days.

(21) Appl. No.: 16/011,756

(22) Filed: Jun. 19, 2018

(65) Prior Publication Data

US 2019/0155723 A1 May 23, 2019

(30) Foreign Application Priority Data

Nov. 21, 2017 (KR) .................. 10-2017-0155352

(51) Int. Cl.
*G06F 12/02* (2006.01)
*G06F 12/0868* (2016.01)
*G06F 12/0866* (2016.01)

(52) U.S. Cl.
CPC ...... *G06F 12/0246* (2013.01); *G06F 12/0866* (2013.01); *G06F 12/0868* (2013.01); *G06F 2212/1016* (2013.01); *G06F 2212/214* (2013.01); *G06F 2212/222* (2013.01); *G06F 2212/312* (2013.01); *G06F 2212/466* (2013.01); *G06F 2212/7201* (2013.01); *G06F 2212/7203* (2013.01); *G06F 2212/7209* (2013.01)

(58) Field of Classification Search
None
See application file for complete search history.

(56) References Cited

U.S. PATENT DOCUMENTS

2018/0293174 A1\* 10/2018 Song .................. G06F 12/0246

FOREIGN PATENT DOCUMENTS

KR 1020140042426 4/2014

\* cited by examiner

*Primary Examiner* — Michael Alsip
(74) *Attorney, Agent, or Firm* — IP & T Group LLP

(57) ABSTRACT

A data storage device includes: a non-volatile memory device, a random access memory and a processor. The non-volatile memory device stores a plurality of L2P entries related to a plurality of logical addresses. The random access memory stores a sequential flag table including sequential flags for a plurality of sequential segments. Each of the sequential flags are flags representing whether physical addresses corresponding to the logical addresses of the sequential segments are sequential or not. The processor identifies a sequential flag of a sequential segment related to read logical address information based on the sequential flag table. The processor reads at least one of the L2P entries, which are correspond to the read logical address information based on the sequential flag and loads the read L2P entry into the random access memory.

15 Claims, 11 Drawing Sheets

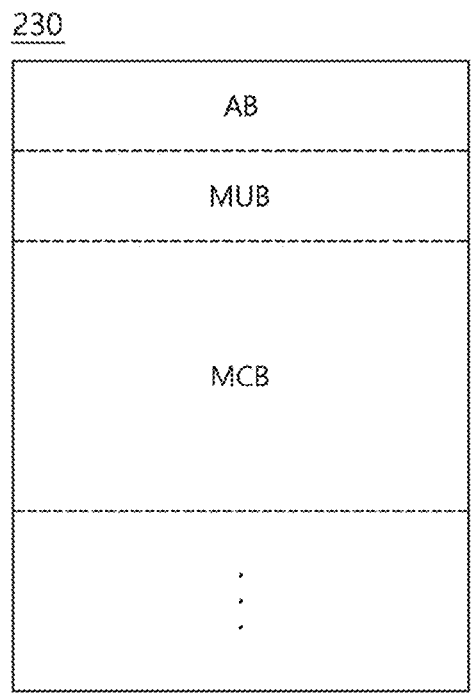

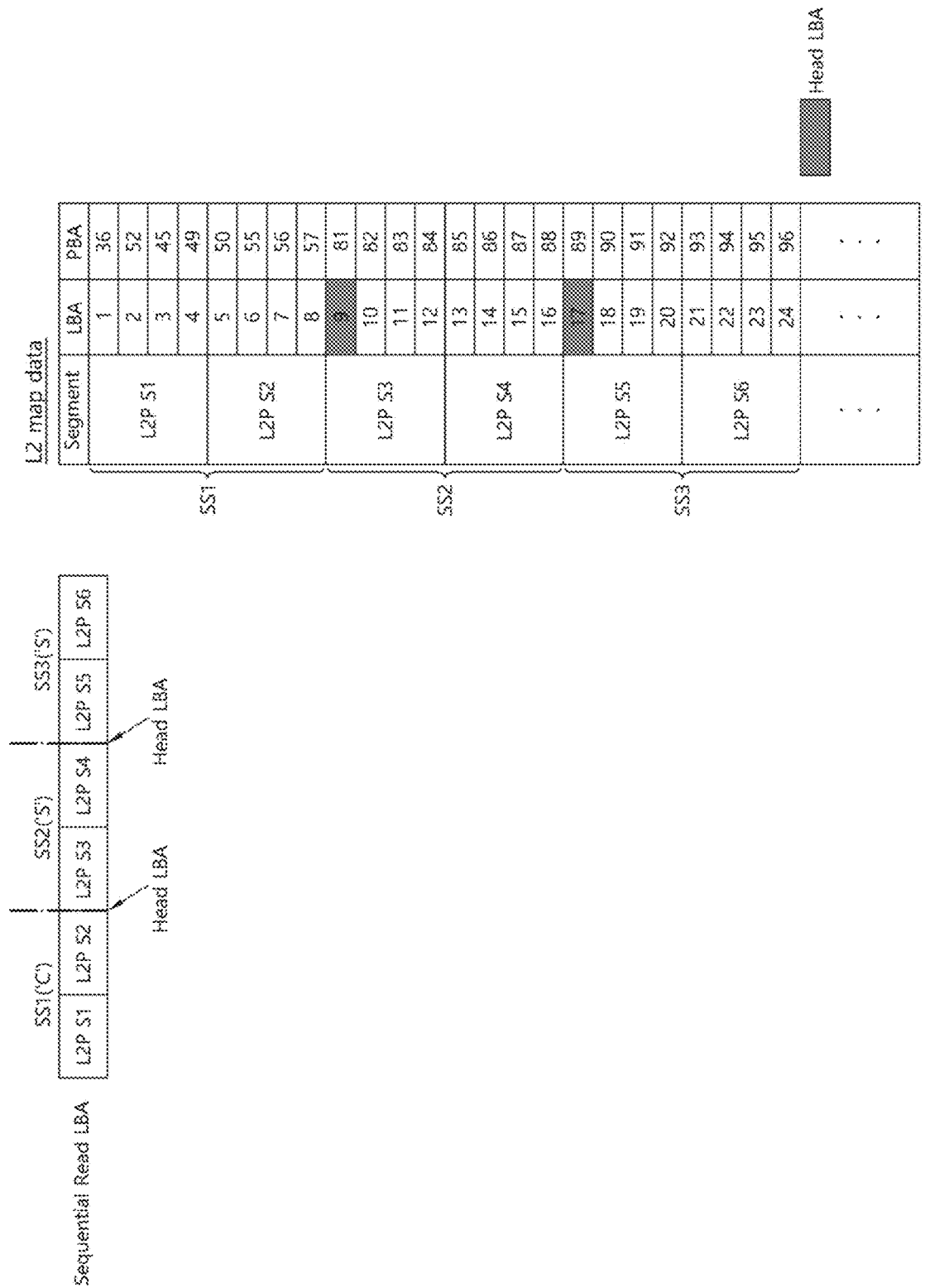

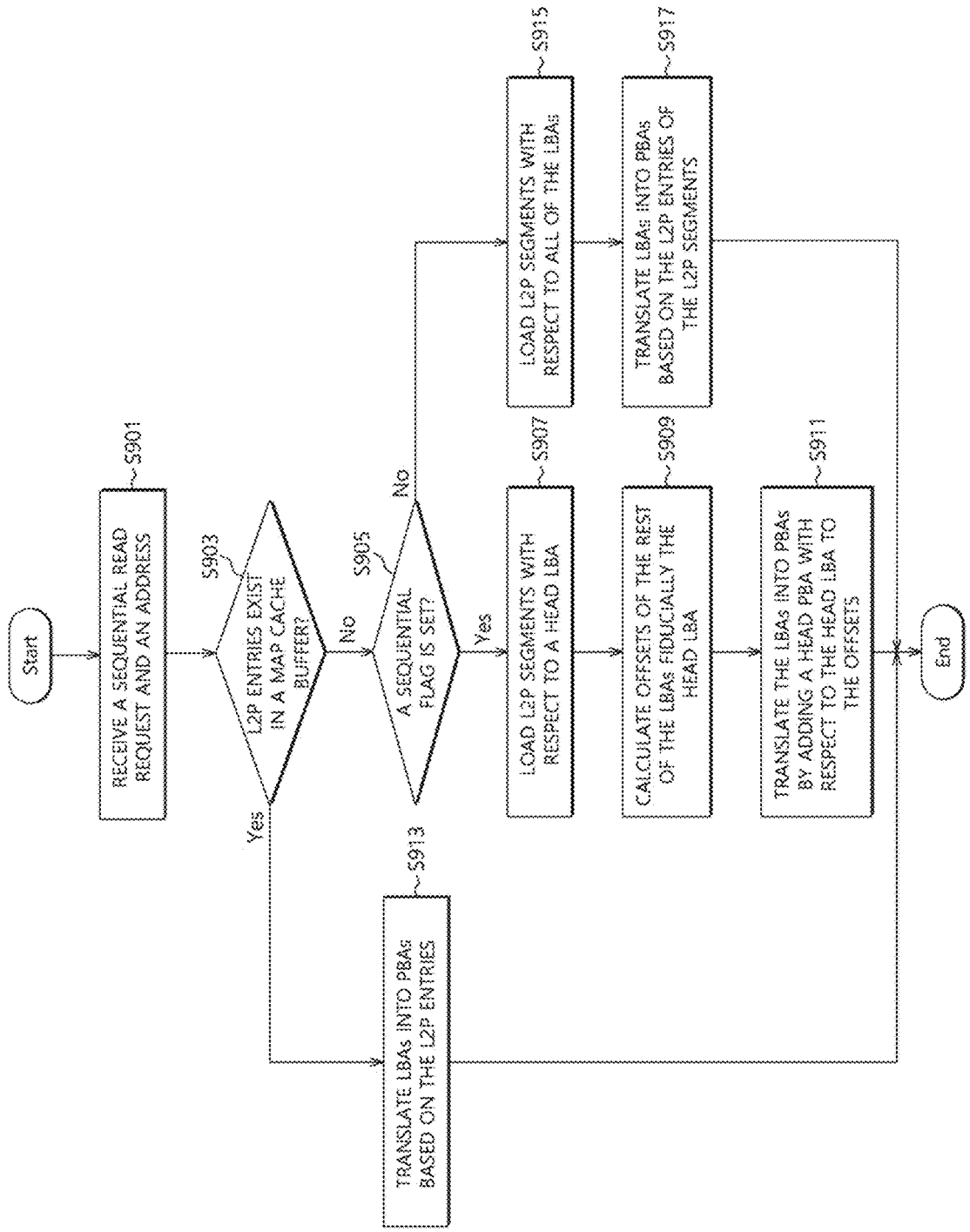

DATA STORAGE DEVICE TO IDENTIFY AND PROCESS A SEQUENTIAL READ REQUEST AND OPERATING METHOD THEREOF

CROSS-REFERENCES TO RELATED APPLICATION

The present application claims priority under 35 U.S.C. § 119(a) to Korean patent application number 10-2017-0155352, filed on Nov. 21, 2017, in the Korean Intellectual Property Office, which is incorporated herein by reference in its entirety.

BACKGROUND

1. Technical Field

Various embodiments relate generally to a semiconductor device and, more particularly, to a data storage device and an operating method thereof.

2. Related Art

Recently, the paradigm of computer environments has been converted into ubiquitous computing that can be used anytime and anywhere. Portable electronic devices such as cellular phones, digital cameras, notebook computers, etc., are widely used. The portable electronic devices may typically include a data storage device using a semiconductor memory device for storing data.

Data storage devices using a memory device do not include a mechanical driving mechanism, hence, they generally exhibit improved stability and reliability over data storage devices employing a mechanical driving mechanism. Furthermore, such data storage devices may have rapid access speed and low power consumption. Examples of data storage devices employing a memory device include a universal serial bus (USB) memory card, a memory card including various interfaces, a universal flash storage (UFS) card, a solid sage drive (SSD), and the like.

SUMMARY

Example embodiments of the present disclosure provide a data storage device having improved reading performance.

Example embodiments of the present disclosure also provide a method of operating the above-mentioned data storage device.

In an embodiment, a data storage device includes a non-volatile memory device, a random access memory and a processor. The non-volatile memory device stores a plurality of L2P entries with respect to a plurality of logical addresses. The random access memory stores a sequential flag table in which sequential flags related to a plurality of sequential segments are stored. Each of the sequential segments includes at least one logical address. Each of the sequential flags are flags representing whether physical addresses corresponding to the logical addresses in each of the sequential segments are sequential or not. The processor identifies a sequential flag of a sequential segment related to read logical address information based on the sequential flag table when a read request and the read logical address information are received from a host device. The processor reads at least one of the L2P entries, which are correspond to the read logical address information based on the sequential flag. The processor loads the read L2P entry into the random access memory.

In an embodiment, an operating method of a data storage device includes: receiving a read request and read logical address information from a host device; determining whether a sequential flag related to at least one sequential segment corresponding to the read logical address information is a set state or not based on a sequential flag table in a random access memory; reading a part of L2P entries corresponding to the read logical address information when the sequential flag is the set state; and loading the read L2P entries into the random access memory. Each of the sequential segments including at least one logical address, and the sequential flags are flags representing whether physical addresses corresponding to the logical addresses in each of the sequential segments are sequential or not.

In an embodiment, a memory system includes: a memory device configured to store a plurality of logical-to-physical (L2P) entries; and a controller. The controller controls the memory device to load therefrom, in response to a sequential read request provided along with consecutive logical addresses respectively corresponding to consecutive physical addresses of the memory device, a L2P entry corresponding to a reference logical address among the consecutive logical addresses and translates the consecutive logical addresses into the consecutive physical addresses through the L2P entry having the reference logical address and the consecutiveness of the logical and physical addresses.

BRIEF DESCRIPTION OF THE DRAWINGS

FIG. 6 is a block diagram illustrating a random access memory;

FIG. 7 is a block diagram illustrating an address buffer in FIG. 6;

FIG. 8 is a block diagram illustrating a map read in accordance with a sequential read request;

FIG. 9 is a flow chart illustrating a method of operating a data storage device in accordance with an embodiment of the present disclosure;

DETAILED DESCRIPTION

Hereinafter, the present invention will be described below with reference to the accompanying drawings through various examples of embodiments. However, it is noted that the described examples are provided solely for the purpose of disclosing the invention and are not intended for limiting the scope of the invention. It should be understood by those skilled in the art to which the present invention pertains that the invention concepts disclosed in the present disclosure may be implemented not only as in the described embodiments but also in various other embodiments or variations thereof without departing from the spirit and scope of the invention.

It is noted that in describing the present disclosure, when it is determined that the detailed description of the known related art may obscure the gist of the present disclosure, the detailed description thereof will be omitted.

It is further noted that in the following description, numerous specific details are set forth in order to provide a thorough understanding of the present invention, however, the present invention may be practiced without some or all these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
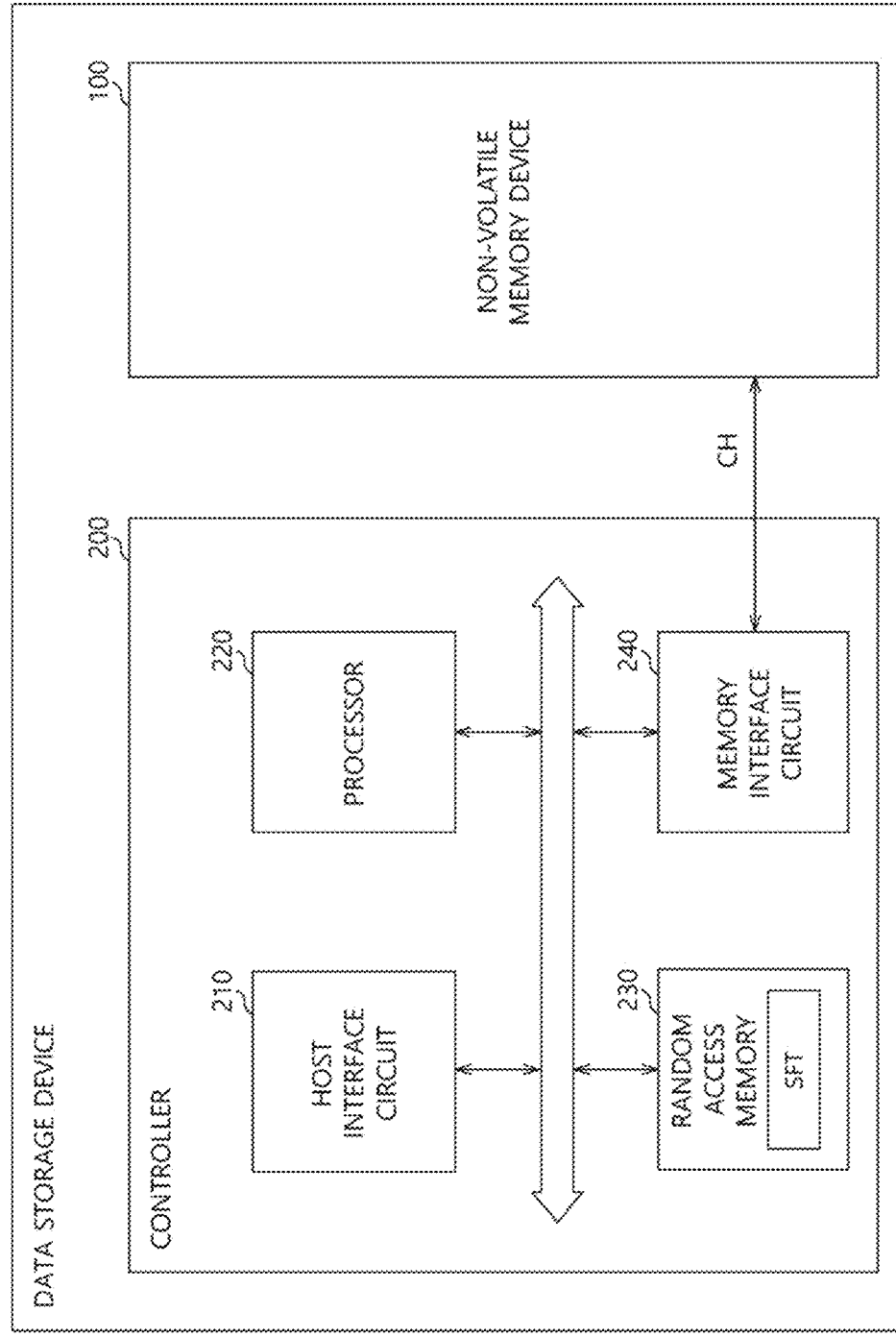
FIG. 1 is a block diagram illustrating a data storage device in accordance with an embodiment of the present disclosure.

FIG. 1 is a block diagram illustrating a data storage device 10 in accordance with an embodiment of the present disclosure.

Referring to FIG. 1, the data storage device 10 of this example embodiment may be configured to store data accessed by a host device such as a cellular phone, an MP3 player, a laptop computer, a desktop computer, a game machine, a TV, an in-vehicle infotainment system, etc. The data storage device 10 may also be referred to as a memory system.

The data storage device 10 may be implemented as various storage devices. Depending on a particular implementation the data storage device may employ a different interface protocol for communicating with the host device. For example, various implementations of the data storage device 10 may include any one of a solid state drive (SSD), a multimedia card such as an MMC, an eMMC, an RS-MMC, a micro-MMC, etc., a secure digital card such as an SD, a mini-SD, a micro-SD, etc., a storage device such as a universal storage bus (USB), a universal flash storage (UFS), a personal computer memory card international association (PCMCIA), etc., a peripheral component interconnection card, a PCI-express (PCI-E) card, a compact flash (CF) card, a smart media card, a memory stack, and the like.

The data storage device 10 may have any one of various package structures, including, for example, a package-on-package (POP), a system-in-package (SIP), a system-on-chip (SOC), a multi-chip package (MCP), a chip-on-board (COB), a wafer-level fabricated package (WFP), a wafer-level stack package (WSP), etc.

The data storage device 10 may include a non-volatile memory device 100 and a controller 200 operatively coupled to each other via one or more communication channels CH. Any suitable communication channel may be used.

The non-volatile memory device 100 may be operated as a storage medium of the data storage device 10. The non-volatile memory device 100 may include a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using chalcogenide compounds, a resistive random access memory (RERAM) using a transition metal oxide compound, and the like.

The non-volatile memory device 100 may include a memory cell array. The memory cell array may include memory cells arranged at intersected regions between word lines and bit lines. The memory cell array may include a plurality of memory blocks. Each of the memory blocks may include a plurality of pages.

For example, each of the memory cells may include a single level cell (SLC) configured to store one bit, a multi level cell (MLC) configured to store two bits, a triple level cell (TLC) configured to store three bits, a quadruple level cell (QLC) configured to store four bits, etc. The memory cell array 110 may include memory cells of at least one of the SLC, MLC, TLC and QLC type memory cells. The memory cell array 110 may have a two-dimensional structure or a three-dimensional structure.

In an implementation of the data storage device 10 of FIG. 1, the non-volatile memory device 100 may be implemented as a single semiconductor chip. However, the invention is not limited in this way, and, the non-volatile memory device 100 in other implementations may include a plurality of semiconductor chips.

Figure 2:
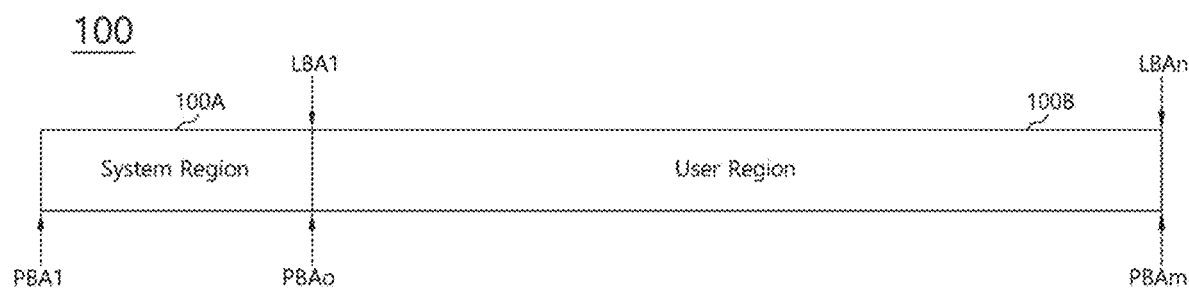
FIG. 2 is a diagram illustrating a region of a non-volatile memory device.

FIG. 2 is a diagram illustrating a region of a non-volatile memory device.

Referring to FIG. 2, the non-volatile memory device 100 may include a system region 100A and a user region 100B. The system region 100A may be configured to store meta-information for managing the non-volatile memory device 100, and information with respect to characteristics of the non-volatile memory device 100 and internal operations such as performance controls, mergence, wear leveling, garbage collection, etc., for effectively managing the non-volatile memory device 100. The system region 100A may be configured to store a map table. The user region 100B may be configured to store program data requested by the host device.

The system region 100A and the user region 100B of the non-volatile memory device 100 may have previously allotted sizes. The controller 200 may transmit size information of the user region 100B to the host device. The host device may set a length of a logical address to be transmitted to the data storage device 10 based on the size information of the user region 100B. The length of the logical address may be numbers of the logical address.

The non-volatile memory device 100 may include first to m^th physical addresses PBA1 to PBAm. In FIG. 2, the system region 100A of the non-volatile memory device 100 may include first to (o−1)^th physical addresses PBA1~PBAo−1. The user region 100B of the non-volatile memory device 100 may include o^th to m^th physical addresses PBAo to PBAm. Here, m and o may be positive integers, and o may be less than m.

When the controller 200 transmits the size information of the user region 100B of the non-volatile memory device 100 corresponding to the oˆth to mˆth physical addresses PBAo to PBAm to the host device, the host device may set the length of the logical address based on the size information of the user region 100B. In FIG. 2, the length of the logical address set by the host device may be first to nˆth logical addresses LBA1 to LBAn. Numbers of the first to nˆth logical addresses LBA1 to LBAn may be equal to or less than numbers of oˆth to mˆth the physical addresses PBAo to PBAm. Here, n may be a positive integer.

Figure 3:
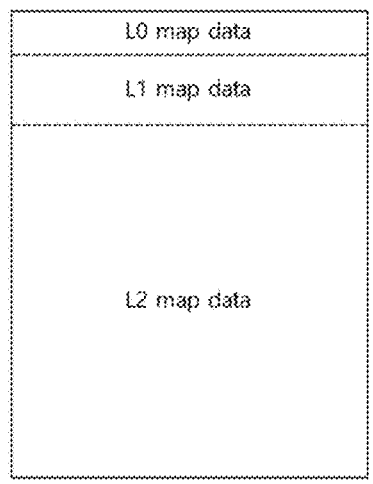
FIG. 3 is a diagram illustrating a map table.

FIG. 3 is a diagram illustrating a map table 105. The map table 105 may be stored in the non-volatile memory device 100.

Referring to FIG. 3, the map table 105 may include L0 map data, L1 map data and L2 map data. The L1 map data may have a level higher than that of the L2 map data. The L0 map data may have a level higher than that of the L1 map data.

The L2 map data may include mapping information between the logical addresses LBA received from the host device and the physical addresses PBA of the non-volatile memory device 100. The mapping information between one logical address and one physical address may be referred to as a logical-to-physical (L2P) entry.

The L2 map data may include a plurality of L2P segments. Each of the L2P segments may include a plurality of L2P entries. The L2P segment is the smallest map read unit meaning that the map data of an L2P segment is the smallest number of map data that can be read from the non-volatile memory device 100 all at once as a unit and loaded into the random access memory 230 of the controller 200.

The L1 map data may include mapping information between indexes of the L2P segments and the physical addresses in which the L2P segments are stored in the non-volatile memory device 100. The L1 map data may include a plurality of L1 segments. Each of the L1 segments may include information indicating a plurality of L2P segments.

The L0 map data may include mapping information between indexes of the L1 segments and the physical addresses in which the L1 segments are stored in the non-volatile memory device 100.

The controller 200 may include a host interface circuit 210, a processor 220, a random access memory 230 and a memory interface circuit 240.

The host interface circuit 210 may be configured to interface the host device with the data storage device 10 via a corresponding protocol to the protocol of the host device. For example, the host interface unit 210 may communicate with the host device through any one of a USB, a UFS, an MMC, a parallel advanced technology attachment (PATA), a serial advanced technology attachment (SATA), a small computer system interface (SCSI), a serial attached SISI (SAS), a peripheral component interconnection (PCI) and a PCI-E.

The processor 220 may be any suitable processor including a micro control unit (MCU) and a central processing unit (CPU). The processor 220 may be configured to process requests transmitted from the host device. In order to process the request transmitted from the host device, the processor 220 may drive the instructions or the algorithms stored in the random access memory 230, e.g., firmware in the random access memory 230.

The processor 220 may group the first to nˆth logical addresses LBA1 to LBAn into a plurality of sequential segments each having a certain number of logical addresses according to a desired length for each sequential segment set by the host.

Figures 4, 5:
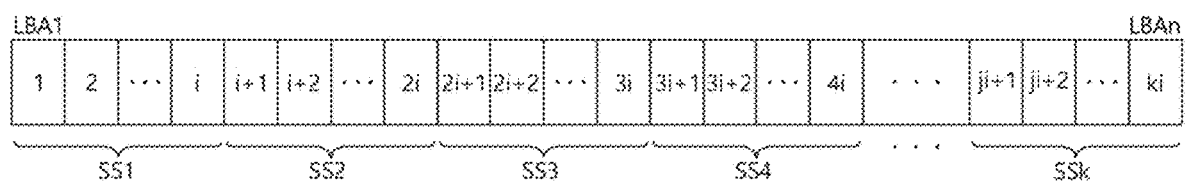
FIG. 4 is a diagram illustrating logical addresses grouped into a plurality of sequential segments.
FIG. 5 is a diagram illustrating a sequential flag table.

FIG. 4 is a diagram illustrating logical addresses grouped into a plurality of sequential segments.

A sequential read request may be provided from the host device to the data storage device 10. A sequential read request may be provided along with a plurality of consecutive logical addresses, for example, first to nˆth consecutive logical addresses LBA1 to LABn as illustrated in FIG. 4.

Referring to FIG. 4, the first to nˆth logical addresses LBA1 to LBAn may be grouped into a k number of sequential segments SS1 to SSk. In FIG. 4, each of the sequential segments SS1 to SSk may include i numbers of logical addresses LBA. The logical addresses LBA in the sequential segments SS1 to SSk may be sequential. Here, and k may be positive integers, and j may be 'k−1'. In FIG. 4, each of the sequential segments SS1 to SSk may include the same number of logical addresses LBA. Alternatively, the number of the logical addresses LBA in each of the sequential segments SS1 to SSk may be different.

Each of the sequential segments SS1 to SSk may include a head logic address Head LBA. The head logic address Head LBA may be a first logical address among the logical addresses in each of the sequential segments SS1 to SSk. In FIG. 4, the head logic addresses Head LBA of each of the sequential segments SS1 to SSk may be LBA1, LBAi+1, LBA2i+1, etc.

The random access memory 230 may include a DRAM or an SRAM. The random access memory 230 may be configured to store the firmware driven by the processor 220. The random access memory 230 may be configured to store the data, for example, meta-data for driving the firmware. That is, the random access memory 230 may be operated as a working memory of the processor 220.

The random access memory 230 may be configured to temporarily store data transmitted from the host device to the non-volatile memory device 100 or data transmitted from the non-volatile memory device 100 to the host device. That is, the random access memory 230 may be operated as a data buffer memory or a data cache memory.

The random access memory 230 may be configured to store a sequential flag table SFT. The sequential flag table SFT may be generated by the processor 220. The sequential flags related to the sequential segments SS1 to SSk in FIG. 4 may be stored in the sequential flag table SFT.

FIG. 5 is a diagram illustrating an example of the sequential flag table SFT.

Referring to FIG. 5, the sequential flag table SFT may be configured to store a k number of the sequential segments SS1 to SSk and the sequential flag related to each of the sequential segments SS1 to SSk. The sequential flag may include information representing whether the physical addresses corresponding to the logical addresses in a corresponding sequential segment SS may be sequential or not. In FIG. 5, the sequential flag 'C' may indicate that the physical addresses corresponding to the logical addresses of a corresponding sequential segment are not sequential. In contrast, the sequential flag 'S' may indicate that the physical addresses corresponding to the logical addresses of a corresponding sequential segment are sequential. The sequential flag 'N' may represent null. The null may mean that the sequential flag is not set to any value.

The processor 220 may generate the sequential flag table SFT related to a k number of the sequential segments SS1 to SSk in the random access memory 230. The processor 220 may set to 'S' or 'C' the sequential flag of the sequential segment including an updated L2P entry at each map update. Particularly, when the physical addresses PBA corresponding to the updated logical addresses LBA are sequential as a result of a map update, the processor 220 may set to 'S' the sequential flag of the sequential segment including the updated logical address LBA of the L2P entry. In contrast, when the physical addresses PBA corresponding to the updated logical addresses LBA are not sequential as a result of a map update, the processor 220 may set to 'C' the sequential flag of the sequential segment including the updated logical address LBA of the L2P entry.

The map update may be performed under various situations. For example, the map update may be performed when the address buffer AB (see FIG. 6) of the random access memory 230 is full of address mapping information, after performing an un-map, after a garbage collection GC, etc. However, the situation where the map update is performed may not be restricted within the above-mentioned situations.

FIG. 6 is a block diagram illustrating an exemplary configuration of the random access memory 230.

Referring to FIG. 6, the random access memory 230 may include an address buffer AB, a map update buffer MUB and a map cache buffer MCB.

The address buffer AB may be configured to store the mapping information of a logical address LBA provided along with a program request from the host device, and the mapping information of a physical address PBA of the non-volatile memory device 100 in which program data is stored. Each address mapping information stored in the address buffer AB may be referred to as a physical-to-logical (P2L) entry.

FIG. 7 is a block diagram illustrating an exemplary configuration of the address buffer AB of FIG. 6.

Referring to FIG. 7, the physical addresses PBA in the address buffer AB may be increased by '1' in the direction of the arrow. That is, the physical addresses PBA stored in the address buffer AB may always be sequential. In FIG. 7, a p number of physical addresses PBA are stored in the address buffer AB. Here, p may be a positive integer.

The physical addresses PBA stored in the address buffer AB may correspond to an address related to a currently used memory block, for example, a memory block on which a program operation may be performed. The physical addresses PBA stored in the address buffer AB may be an extremely small portion of the physical addresses PBA1 to PBAm of the non-volatile memory device 100. Whenever a memory block changes, the physical addresses PBA stored in the address buffer AB may be changed into the physical addresses PBA corresponding to the changed memory block.

The logical addresses LBA mapped with the physical addresses PBA and stored in the address buffer AB may be sequential or not. In FIG. 7, the logical addresses LBA are exemplified as sequential.

When the address buffer AB is filled with the P2L entries, for example, when p numbers of P2L entries have been entered in the address buffer AB, the processor 220 may perform a map update. The map update means that the map data of the map table (see FIG. 3) in the non-volatile memory device 100 may be renewed. The map update may be performed based on the P2L entries stored in the address buffer AB.

The map update buffer MUB may store an L2P segment to be updated among the L2P segments of the L2 map data in the map table of the non-volatile memory device 100. The processor 220 may change the physical address PBA of each of the L2P entries of the L2P segments in the map update buffer MUB based on the P2L entries in the address buffer AB. After the physical address PBA of each of the L2P entries is changed in the map update buffer MUB, the processor 220 may write the changed L2P segment of the map update buffer MUB into the map table of the non-volatile memory device 100 to complete the map update.

The map cache buffer MCB may cache the map data corresponding to the logical addresses provided along with recent and/or frequent read requests from the host device. The map data cached by the map cache buffer MCB may include L0 map data, L1 map data and L2 map data. For example, the map cache buffer MCB may cache all of the L0 map data, a part of the L1 segments of the L1 map data, and a part of L2P segments of the L2 map data, but this is not limited thereto.

When the read request and the logical address to be read (i.e., read logical address) are received from the host device, the processor 220 may scan the L2 map data cached in the map cache buffer MCB for translating the read logical address into the corresponding physical address.

When the L2P entry corresponding to the read logical address exists in the map cache buffer MCB, the processor 220 may translate the read logical address into the corresponding physical address.

In contrast, when the L2P entry corresponding to the read logical address does not exist in the map cache buffer MCB, the processor 220 may scan the L1 map data cached in the map cache buffer MCB to find the physical address at which the L2P segment including the L2P entry corresponding to the read logical address is stored in the non-volatile memory device 100.

When the physical address of the L2P segment related to the read logical address is found from the L1 map data cached in the map cache buffer MCB, the processor 220 may read the L2P segment at the found physical address from the non-volatile memory device 100. The read L2P segment may be cached in the map cache buffer MCB. The processor 220 may translate the read logical address into the corresponding physical address based on the L2P entries of the cached L2P segment.

When the physical address of the L2P segment related to the read logical address is not found from the L1 map data cached in the map cache buffer MCB, the processor 220 may scan the L0 map data to find the physical address at which the L1 segment indicating the L2P segment related to the read logical address is stored in the non-volatile memory device 100.

When the physical address of the L1 segment indicating the L2P segment related to the read logical address is found from the L0 map data cached in the map cache buffer MCB, the processor 220 may read the L1 segment at the found physical address from the non-volatile memory device 100. The read L1 segment may be cached in the map cache buffer MCB. The processor 220 may scan the cached L1 segment to find the physical address at which the L2P segment including the L2P entry corresponding to the read logical address is stored in the non-volatile memory device 100. The processor 220 may read the L2P segment at the found physical address from the non-volatile memory device 100. The read L2P segment may be cached in the map cache buffer MCB.

When the read request and the read logical address is received from the host device, the processor 220 may first scan the map cache buffer MCB to identify whether or not the L2P entry corresponding to the read logical address may exist in the map cache buffer MCB. When the L2P entry does not exist in the map cache buffer MCB, the processor 220 may read the L2P segment including the corresponding L2P entry from the map table of the non-volatile memory device 100 to cache the read L2P segment in the map cache buffer MCB. The operations of reading the L2P segment from the non-volatile memory device 100 and caching the read L2P segment in the map cache buffer MCB are referred to herein as a map read.

Because only one L2P segment is read and cached in the map cache buffer MCB by the one map read, the map read may be executed a plurality of times when it is necessary to read and cache a plurality of the L2P segments for processing the read request from the host device.

When the sequential read request is received from the host device, the length of the read logical address, hereinafter referred to as a sequential read logical address, i.e., the number of logical addresses consecutive from a start address to an end address of a sequential read logical address may be several or dozen times greater than the number of logical addresses in one L2P segment.

For convenience of explanations, in the described embodiments, it is assumed that the length of a sequential read logical address may correspond to ten L2P segments. When the L2P entries corresponding to the sequential read logical address do not exist in the map cache buffer MCB, the processor 220 may perform the map read ten times to read the ten L2P segments corresponding to the sequential read logical address and to cache the read L2P segments in the map cache buffer MCB. Thus, the read performance may be reduced by performing the map read ten times. Further, when a space in the map cache buffer MCB is not enough to cache the ten L2P segments, the L2P segments previously cached in the map cache buffer MCB may be partially erased to ensure the space so that the read performance may be reduced further.

FIG. 8 is a block diagram illustrating a map read in accordance with a sequential read request. For convenience of explanations, it is assumed that the sequential read logical address includes three sequential segments SS1 to SS3, each of the sequential segments SS1 to SS3 has a length including two L2P segments and each of the L2P segments includes four L2P entries. FIG. 8 exemplifies the first sequential segment SS1 including first and second L2P segments L2P S1 and L2P S2, the second sequential segment SS2 including third and fourth L2P segments L2P S3 and L2P S4, and the third sequential segment SS3 including fifth and sixth L2P segments L2P S5 and L2P S6.

When a read request and a read logical address are received from the host device, the processor 220 may determine whether the received read request may correspond to a random read request or a sequential read request based on the length of the received read logical request. For example, when the length of the read logical address is equal or more than a predetermined length, the processor 220 may determine that the received read request is a sequential read request.

The processor 220 may scan the map cache buffer MCB (see FIG. 6) to identify whether the L2P entries corresponding to the sequential read logical address are cached or not. When the L2P entries corresponding to the sequential read logical address are not cached in the map cache buffer MCB, the processor 220 may identify the sequential flags of the sequential segments SS1 to SS3 in the sequential read logical address based on the sequential flag table SFT stored in the random access memory 230.

In FIG. 8, the sequential flag of the first sequential segment SS1 in the sequential read logical address may have a set value representing 'C', and each sequential flag of the second and third sequential segments SS2 and SS3 may have a set value representing 'S'. Thus, in the L2 map data stored in the non-volatile memory device 100 shown in FIG. 8, the physical addresses corresponding to the logical addresses LBA1 to LBA8 in the first sequential segment SS1 are not sequential, and the physical addresses corresponding to the logical addresses LBA9 to LBA24 in the second and third sequential segments SS2 and SS3 are sequential.

The processor 220 may read the first and second L2P segments L2P S1 and L2P S2 including the logical addresses LBA1 to LBA8 of the first sequential segment SS1 by the two map read from the L2 map data of the non-volatile memory device 100 to cache the read first and second L2P segments L2P S1 and L2P S2 in the map cache buffer MCB.

The processor 220 may read the third and fifth L2P segments L2P S3 and L2P S5 including the head logical addresses Head LBA of the second and third sequential segments SS2 and SS3 from the L2 map data of the non-volatile memory device 100, respectively, to cache the read third and fifth L2P segments L2P S3 and L2P S5 in the map cache buffer MCB.

Particularly, the processor 220 may read the third L2P segment L2P S3 including the head logical address Head LBA (e.g., a logical address LBA9 as shown in FIG. 8) of the second sequential segment SS2 among the third and fourth L2P segments L2P S3 and L2P S4, which include the logical addresses LBA9 to LBA16 of the second sequential segment SS2, to cache the read third L2P segment L2P S3 in the map cache buffer MCB.

The processor 220 may read the fifth L2P segment L2P S5 including the head logical address Head LBA of the third sequential segment SS3 (e.g., a logical address LBA17 as shown in FIG. 8) among the fifth and sixth L2P segments L2P S5 and L2P S6, which include the logical addresses LBA17 to LBA24 of the third sequential segment SS3, to cache the read fifth L2P segment L2P S5 in the map cache buffer MCB.

That is, one map read may be performed on each of the second and third sequential segments SS2 and SS3. The four L2P segments L2P S1, L2P S2, L2P S3 and L2P S5 related to the sequential read logical address may be cached in the map cache buffer MCB.

The processor 220 may read the L2P segments corresponding to the sequential segment having the sequential flag set to 'C', and may cache the read L2P segments in the map cache buffer MCB. The processor 220 may read the L2P segment including the head logical address Head LBA of the sequential segment having the sequential flag set to 'S' among the L2P segments corresponding to the sequential segment, and may cache the read L2P segment including the head logical address Head LBA in the map cache buffer MCB. Therefore, performing times of the map reading and a size of a space where the map cache buffer MCB may be placed may be reduced so that the reading performance may be improved.

The processor 220 may translate the logical addresses LBA1 to LBA8 of the first sequential segment SS1 into the physical addresses PBA36, PBA52, PBA45, PBA49, PBA50, PBA55, PBA56 and PBA57 based on the L2P entries of the first and second L2P segments L2P S1 and L2P S2 cached in the map cache buffer MCB.

The processor 220 may calculate offsets of the rest of the logical addresses LBA10 to LBA16 among the logical addresses LBA9 to LBA16 of the second sequential segment SS2 based on the head logical address LBA9. The processor 220 may translate the head logical address LBA9 of the second sequential segment SS2 into the physical address PBA81 based on the L2P entries of the third L2P segment L2P S3 cached in the map cache buffer MCB. The processor 220 may translate each of the rest of the logical addresses LBA10 to LBA16 of the second sequential segment SS2 into corresponding the physical addresses by adding the physical address PBA81 of the head logical address LBA9 to the calculated offset.

For example, the offsets of the rest of the logical addresses LBA10 to LBA16 of the second sequential segment SS2 may be 1, 2, 3, 4, 5, 6 and 7. The processor 220 may add the physical address PBA81 of the head logical address LBA9 to 1 to translate the logical address LBA10 into the physical address PBA82. The processor 220 may add the physical address PBA81 of the head logical address LBA9 to 2, 3, 4, 5, 6 and 7 to translate the logical addresses LBA11 to LBA16 into the physical addresses PBA83 to PBA88.

The processor 220 may calculate offsets of the rest of the logical addresses LBA18 to LBA24 among the logical addresses LBA17 to LBA24 of the third sequential segment SS3 based on the head logical address LBA17. The processor 220 may translate the logical addresses LBA18 to LBA24 into corresponding the physical addresses by adding the physical address PBA89 related to the head logical address LBA17 to the calculated offsets.

Referring back to FIG. 1, the memory interface circuit 240 may control the non-volatile memory device 100 by controlling of the processor 220. The memory interface circuit 240 may be referred to as a memory control circuit. The memory interface circuit 240 may provide control signals to the non-volatile memory device 100. The control signals may include commands, addresses, etc., for controlling the non-volatile memory device 100. The memory interface circuit 240 may provide data to the non-volatile memory device 100 or receive data from the non-volatile memory device 100. The memory interface circuit 240 may be connected with the non-volatile memory device 100 through a channel CH including at least one signal line.

FIG. 9 is a flow chart illustrating a method of operating a data storage device in accordance with example embodiments. For convenience of explanations, the sequential read logic address may include one sequential segment.

Referring to FIG. 9, in operation S901, the sequential read request and the sequential read logical address may be received from the host device. The processor 220 may determine whether a read request from the host device may be a random read request or a sequential read request For example, the processor 220 may determine whether the received read request may correspond to a random read request or a sequential read request based on the length of the received read logical request.

In operation S903, the processor 220 may scan the map cache buffer MCB of the random access memory 230 to identify whether the L2P entries related to the received sequential read logical address may exist in the map cache buffer MCB or not.

When the L2P entries related to the received sequential read logical address do not exist in the map cache buffer MUB ('No' at operation S903), the processor 220 may proceed to operation S905.

In operation S905, the processor 220 may identify whether the sequential flags corresponding to the sequential read logical address are set to 'S' or 'C' based on the sequential flag table SFT in the random access memory 230.

When the sequential flag corresponding to the sequential read logic address is set to 'S' ('Yes' at operation S905), the processor 220 may proceed to operation S907.

In operation S907, the processor 220 may read the L2P segment from the L2 map data of the non-volatile memory device 100 according to the head logical address Head LBA (see FIG. 8) of the sequential read logical address, and may cache the read L2P segment in the map cache buffer MCB.

In operation S909, the processor 220 may calculate the offsets of the rest of the logical addresses based on the head logic address Head LBA in the sequential read logical address.

In operation S911, the processor 220 may translate the head logical address Head LBA into corresponding head physical address Head PBA based on the L2P segment cached in the map cache buffer MCB. The processor 220 may translate the rest of the logical addresses LBA into corresponding the physical addresses PBA by adding the head physical address Head PBA to the offsets.

When the sequential flag corresponding to the sequential read logic address is set to 'C' ('No' at operation S905), the processor 220 may proceed to operation S915.

In operation S915, the processor 220 may read the L2P segments related to all of the logical addresses in the sequential read logical address from the L2 map data of the map table in the non-volatile memory device 100 and cache the read L2P segments in the map cache buffer MCB.

In operation S917, the processor 220 may translate all of the logical addresses in the sequential read logical address into corresponding the physical addresses based on the L2P entries of the L2P segments cached in the map cache buffer MCB.

When the L2P entries related to the received sequential read logical address exist in the map cache buffer MCB ('Yes' at operation S903), the processor 220 may proceed to operation S913.

In operation S913, the processor 220 may translate all of the logical addresses in the sequential read logical address into corresponding physical addresses based on the L2P entries in the map cache buffer MCB.

Figure 10:
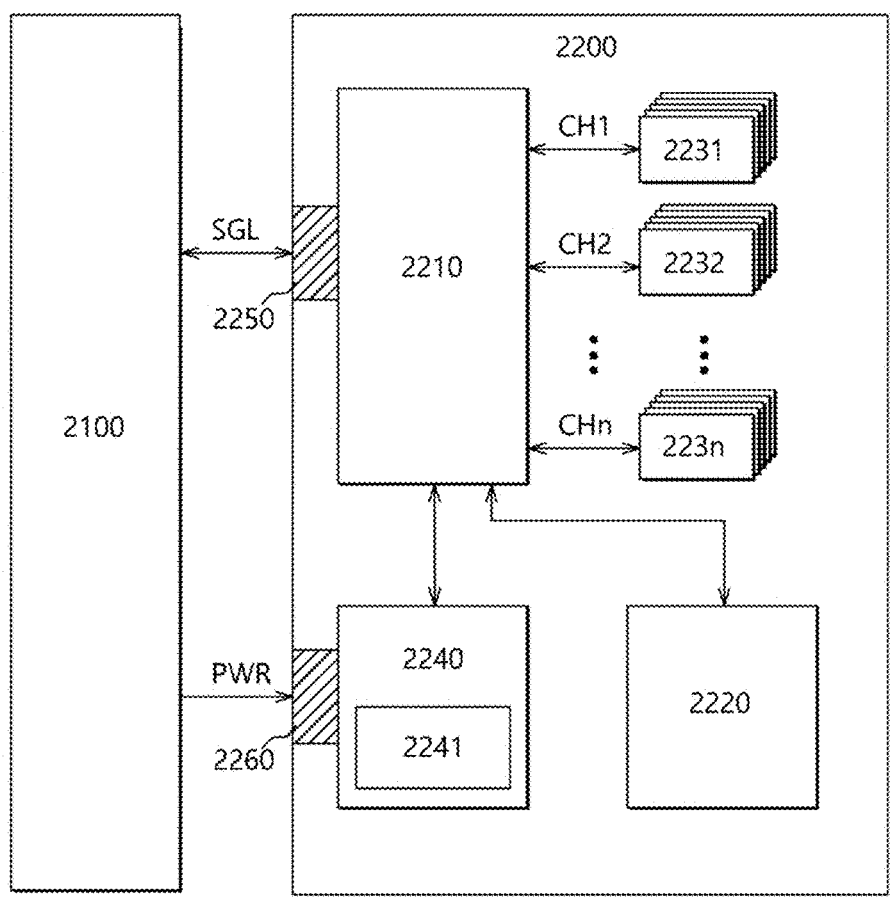
FIG. 10 is a diagram illustrating an example of a data processing system including a solid state drive (SSD) in accordance with an embodiment of the present disclosure.

FIG. 10 is a diagram illustrating an example of a data processing system including a solid state drive (SSD) in accordance with an embodiment. Referring to FIG. 10, a data processing system 2000 may include a host apparatus 2100 and a SSD 2200.

The SSD 2200 may include a controller 2210, a buffer memory device 2220, non-volatile memory devices 2231 to 223n, a power supply 2240, a signal connector 2250, and a power connector 2260.

The controller 2210 may control an overall operation of the SSD 2200.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 11:
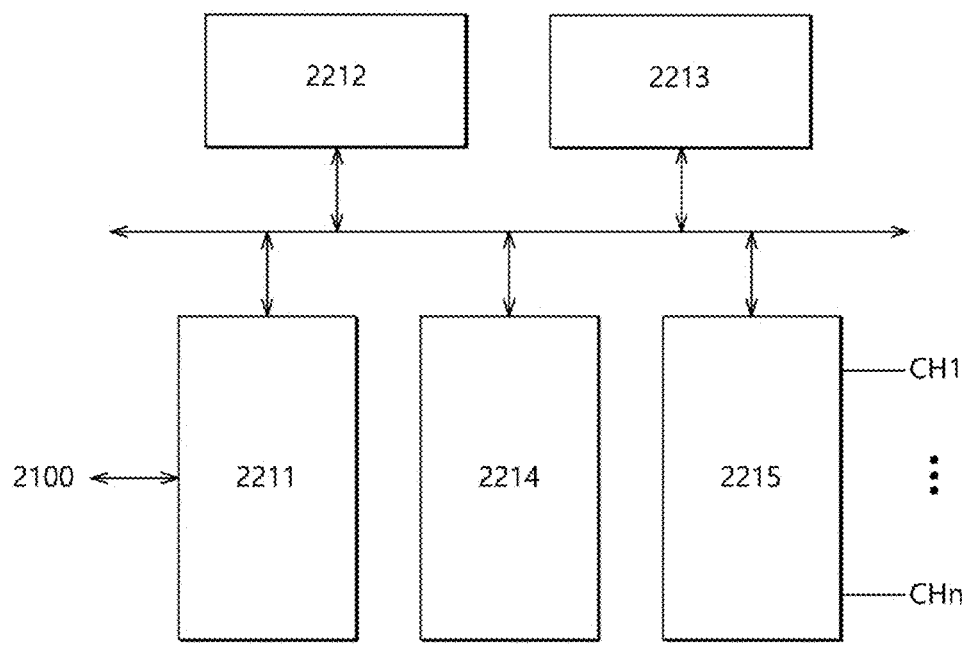
FIG. 11 is a diagram illustrating an example of a controller illustrated in FIG. 10.

FIG. 11 is a diagram illustrating an example of the controller 2210 of FIG. 10. Referring to FIG. 11, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 12:
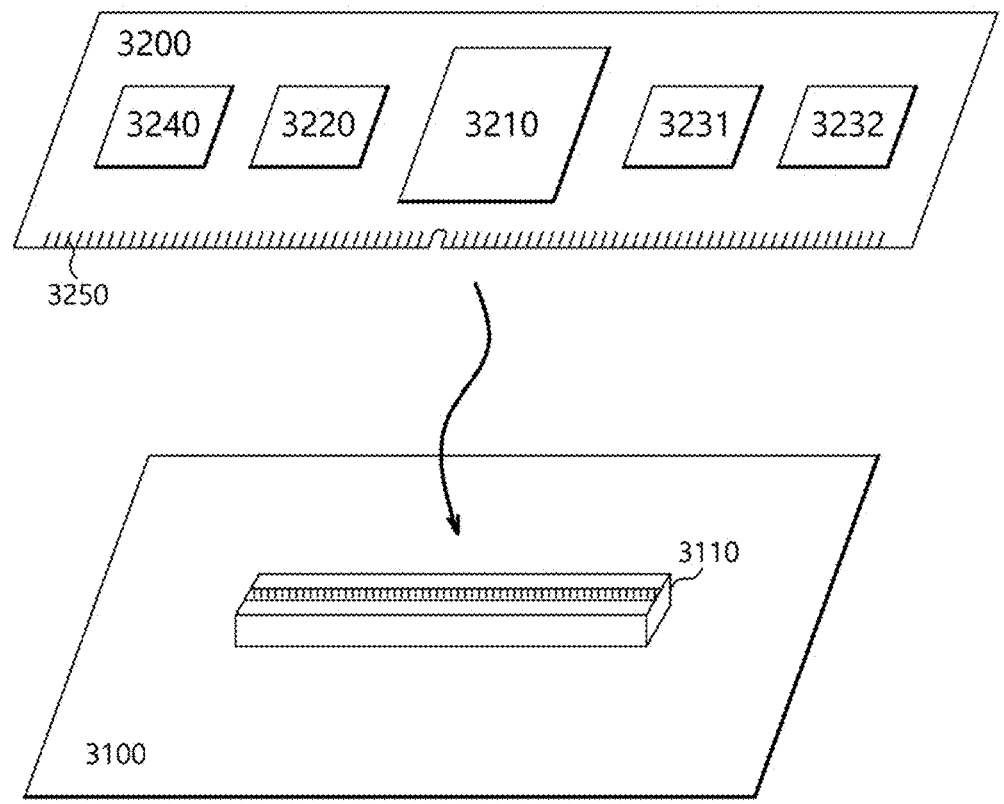
FIG. 12 is a diagram illustrating an example of a data processing system including a data storage apparatus in accordance with an embodiment of the present disclosure.

FIG. 12 is a diagram illustrating an example of a data processing system including a data storage apparatus in accordance with an embodiment. Referring to FIG. 12, a data processing system 3000 may include a host apparatus 3100 and a data storage apparatus 3200.

The host apparatus 3100 may be configured in a board form such as a printed circuit board (PCB). Although not shown in FIG. 12, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 13:
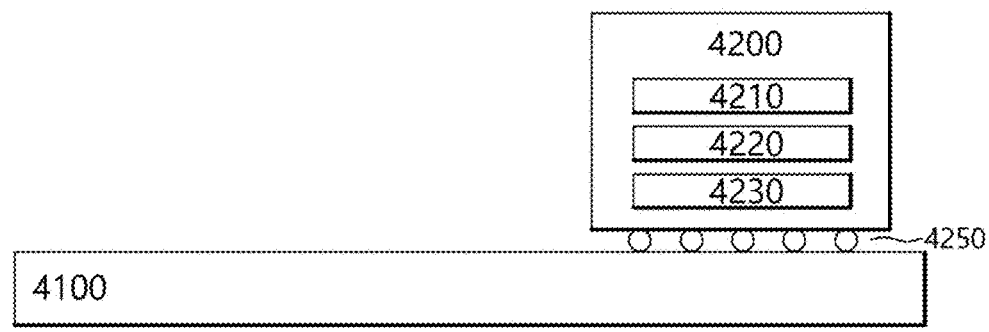
FIG. 13 is a diagram illustrating an example of a data processing system including a data storage apparatus in accordance with an embodiment of the present disclosure.

FIG. 13 is a diagram illustrating an example of a data processing system including a data storage apparatus in accordance with an embodiment. Referring to FIG. 13, a data processing system 4000 may include a host apparatus 4100 and a data storage apparatus 4200.

The host apparatus 4100 may be configured in a board form such as a PCB. Although not shown in FIG. 13, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 14:
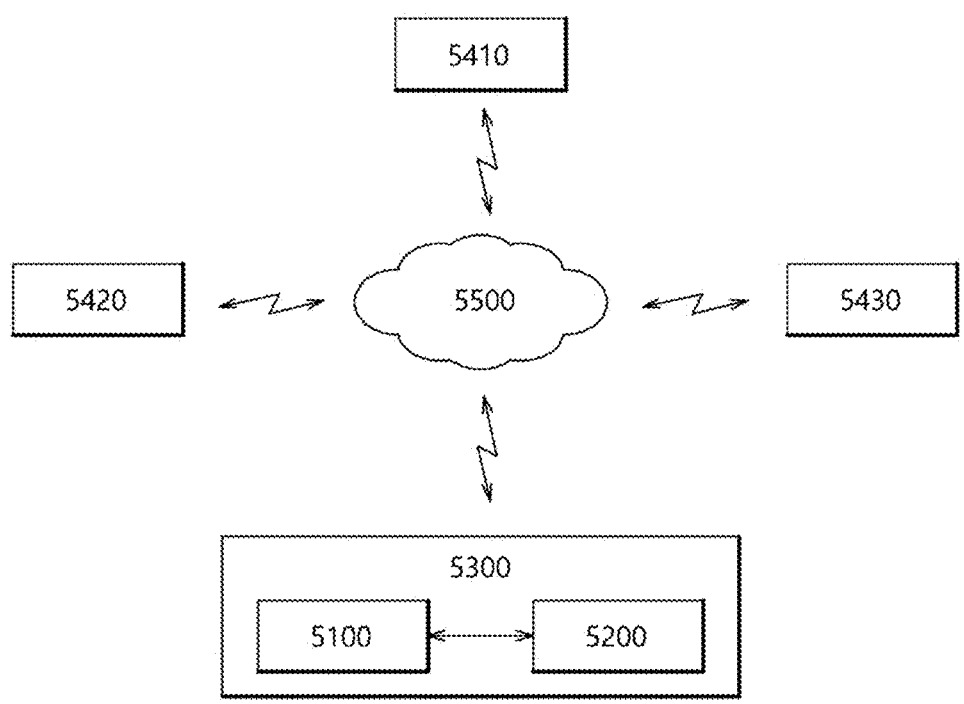
FIG. 14 is a diagram illustrating an example of a network system including a data storage apparatus in accordance with an embodiment of the present disclosure.

FIG. 14 is a diagram illustrating an example of a network system 5000 including a data storage apparatus in accordance with an embodiment. Referring to FIG. 14, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10 of FIG. 1, the data storage apparatus 2200 of FIG. 10, the data storage apparatus 3200 of FIG. 12, or the data storage apparatus 4200 of FIG. 13.

Figure 15:
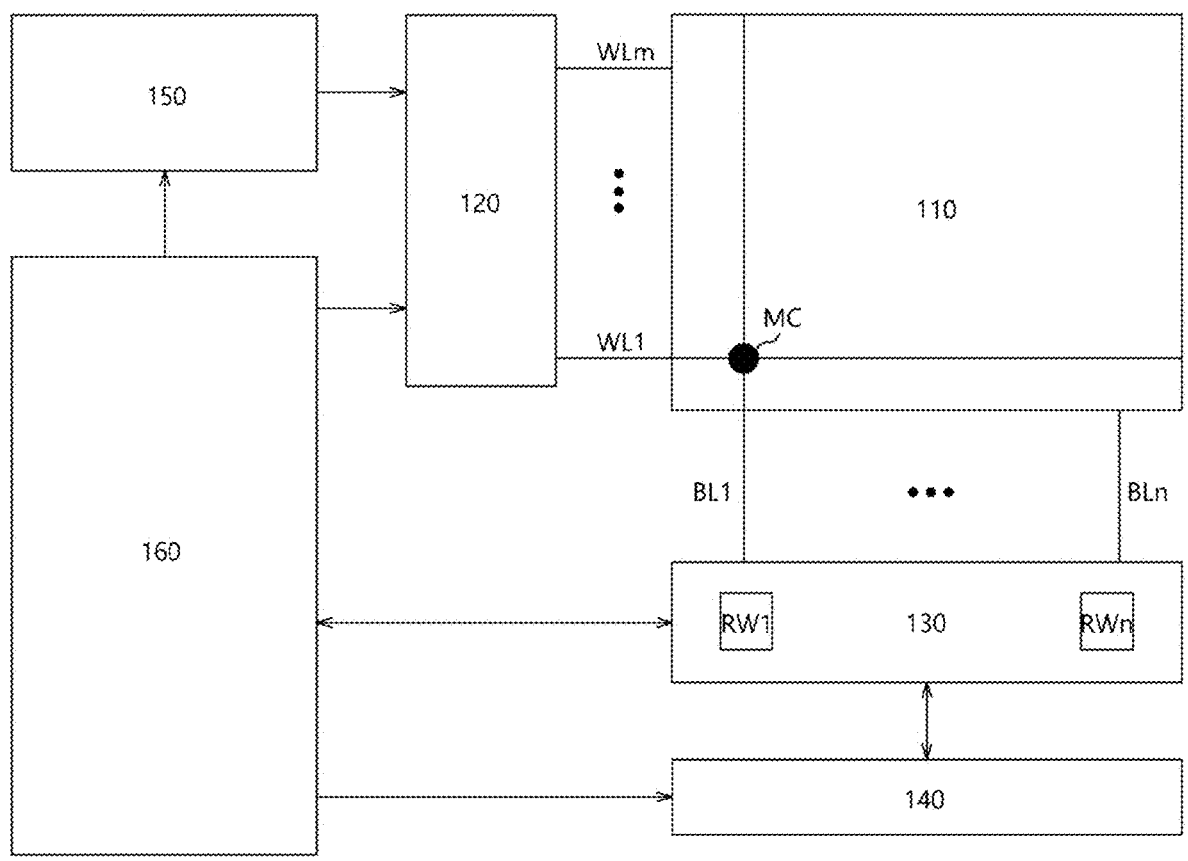
FIG. 15 is a block diagram illustrating an example of a nonvolatile memory device included in a data storage apparatus in accordance with an embodiment of the present disclosure.

FIG. 15 is a block diagram illustrating an example of a nonvolatile memory device included in a data storage apparatus in accordance with an embodiment. Referring to FIG. 15, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above embodiments of the present disclosure are illustrative and not limitative. Various alternatives and equivalents are possible. The examples of the embodiments are not limited by the embodiments described herein. Nor is the present disclosure limited to any specific type of semiconductor device. Other additions, subtractions, or modifications are obvious in view of the present disclosure and are intended to fall within the scope of the appended claims.

What is claimed is:

1. A data storage device comprising:
a non-volatile memory device configured to store a plurality of logical-to-physical (L2P) entries related to a plurality of logical addresses;
a random access memory configured to store a sequential flag table in which sequential flags related to a plurality of sequential segments are stored, each of the sequential segments including at least one logical address, wherein the sequential flags are flags representing whether physical addresses corresponding to the logical addresses in each of the sequential segments are sequential or not; and
a processor configured to identify a sequential flag of a sequential segment related to read logical address information based on the sequential flag table when a read request and the read logical address information are received from a host device, read all of or a part of L2P entries corresponding to the read logical address information based on the sequential flag from the non-volatile memory device, and load the read L2P entries into the random access memory.

2. The data storage device of claim 1, wherein the sequential flag comprises a set state and a clear state,
wherein the set state represents that physical addresses corresponding to logical addresses in a sequential segment corresponding to the sequential flag are sequential, and
wherein the clear state represents that physical addresses corresponding to logical addresses in a sequential segment corresponding to the sequential flag are not sequential.

3. The data storage device of claim 2, wherein the processor reads a part of L2P entries corresponding to the read logical address information and loads the read L2P entries into the random access memory when the sequential flag of the sequential segment related to the read logical address information is the set state.

4. The data storage device of claim 3, wherein the read logical address information comprise a plurality of logical addresses, and
wherein the processor calculates offsets related to the rest of the logical addresses fiducially a head logical address among the logical addresses.

5. The data storage device of claim 4, wherein the processor translates the head logical address into a corresponding head physical address based on the L2P entries related to the read logical address information in the random access memory, and
wherein the processor translates the rest of the logical addresses into corresponding physical addresses by adding the head physical address to the calculated offsets.

6. The data storage device of claim 1, wherein the processor generates the plurality of the sequential segments by grouping the plurality of the logical addresses into a predetermined number.

7. The data storage device of claim 1, when a map update is performed to update physical addresses of at least one L2P entries among the L2P entries,
wherein the processor stores or updates sequential flags related to sequential segments related to logical addresses, which correspond to the updated physical address.

8. The data storage device of claim 2, wherein the processor reads all L2P entries corresponding to the read logical address information and load the read L2P entries into the random access memory when the sequential flag of the sequential segment related to the read logical address information is the clear state.

9. A method of operating a data storage device, the data storage device including a non-volatile memory device configured to store a plurality of logical-to-physical (L2P) entries related to a plurality of logical addresses, and a controller configured to control the non-volatile memory device, the method comprising:
receiving by the controller a read request and read logical address information from a host device;
determining by the controller whether a sequential flag related to at least one sequential segment corresponding to the read logical address information is a set state or not based on a sequential flag table in a random access memory;
reading by the controller a part of L2P entries corresponding to the read logical address information when the sequential flag is the set state; and
loading by the controller the read L2P entries into the random access memory,
wherein each of the sequential segments including at least one logical address, and
wherein the sequential flags are flags representing whether physical addresses corresponding to the logical addresses in each of the sequential segments are sequential or not.

10. The method of claim 9, wherein the sequential flag comprises the set state and a clear state,
wherein the set state represents that physical addresses corresponding to logical addresses in a sequential segment corresponding to the sequential flag are sequential, and
wherein the clear state represents that physical addresses corresponding to logical addresses in a sequential segment corresponding to the sequential flag are not sequential.

11. The method of claim 9, wherein the determining of whether the sequential flag is the set state or not includes:
reading all the L2P entries corresponding to the read logical address information, and loading the read L2P entries into the random access memory when the sequential flag of the sequential segment related to the read logic address information is not the set state.

12. The method of claim 9, after the receiving of the read request and the read logical address information, further comprising:
determining by the controller whether the L2P entries related to the read logical address information exist in a map cache buffer of the random access memory or not.

13. The method of claim 12, wherein the controller translates a plurality of logical addresses in the read logical address information into corresponding a plurality of physical addresses based on the L2P entries in the map cache buffer when the L2P entries related to the read logical address information exist in the map cache buffer.

14. The method of claim 12, wherein the controller determines whether the sequential flag related to the sequential segments corresponding to the read logical address information is the set state or not when the L2P entries related to the read logical address information do not exist in the map cache buffer.

15. The method of claim 9, after loading the read L2P entries into the random access memory, further comprising:
calculating by the controller offsets related to the rest of the logical addresses fiducially a head logical address among the logical addresses in the read logical address information;
translating by the controller the head logical address into a corresponding head physical address based on the L2P entries related to the read logical address information in the random access memory; and
adding by the controller the offsets to the head physical address and translating by controller the rest of the logical addresses into corresponding physical addresses.

* * * * *